May 14, 1940.  R. J. LENNON  2,200,283
UNIVERSAL MOUNTING
Filed Oct. 11, 1937  2 Sheets—Sheet 1
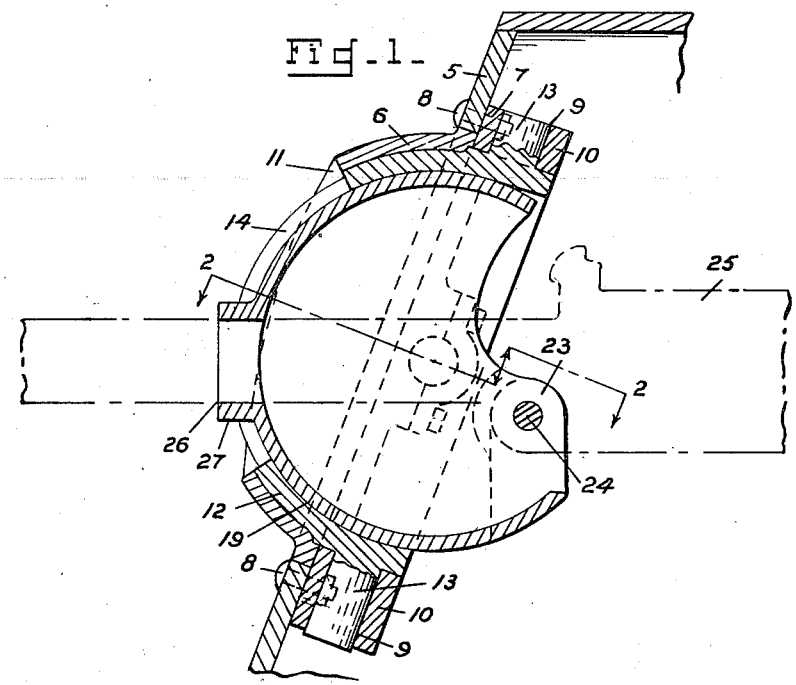
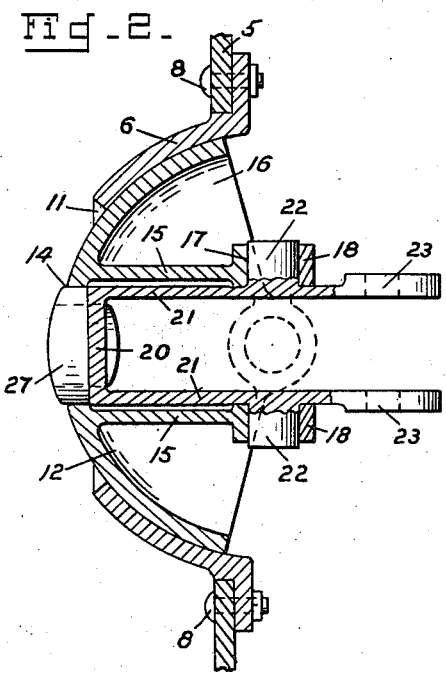
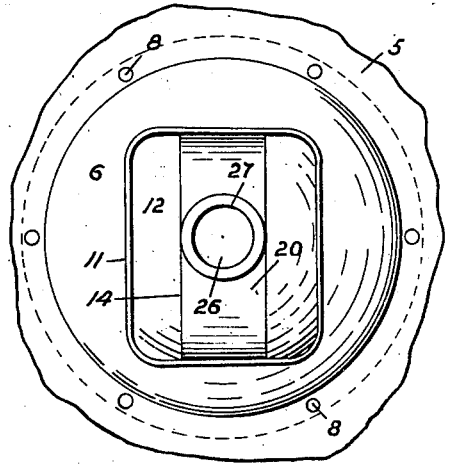
Inventor
Robert J. Lennon
By W. N. Roach
Attorney

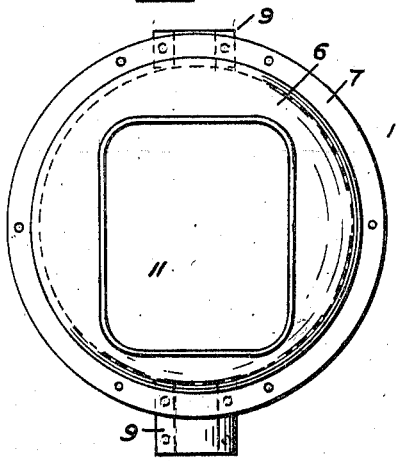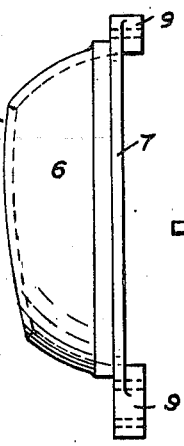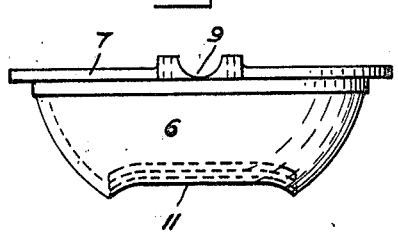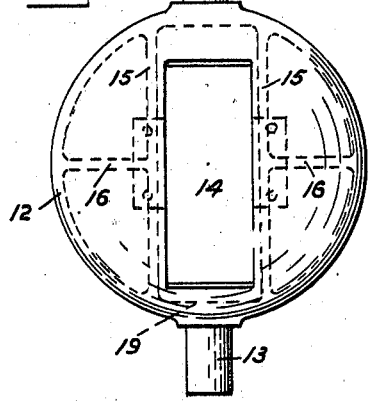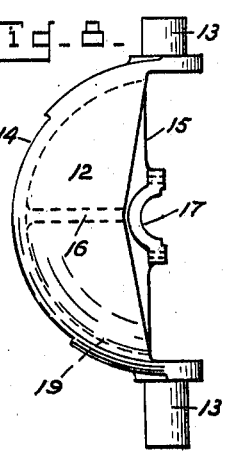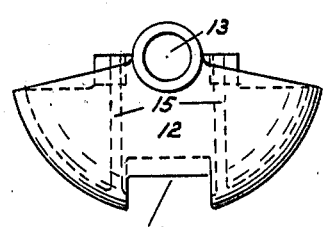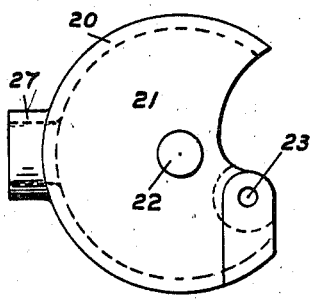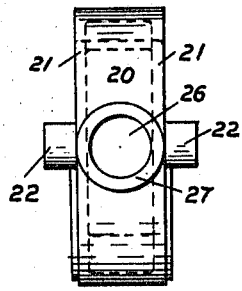

Patented May 14, 1940

2,200,283

UNITED STATES PATENT OFFICE 2,200,283

UNIVERSAL MOUNTING

Robert J. Lennon, East Moline, Ill.

Application October 11, 1937, Serial No. 168,437

3 Claims. (Cl. 89—37)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a universal mounting.

The purpose of the invention is to provide a simple and easily constructed universal mounting which is adapted to carry a member to be pointed, which may be readily and quickly assembled, which will have close fitting parts, and which will afford ample movement for the member to be pointed.

The invention is characterized by the employment of an outer spherical member and an inner cylindrical member.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a longitudinal sectional view of a universal mounting constructed in accordance with the invention;

Fig. 2 is a sectional view on the line 2—2 of Fig. 1;

Fig. 3 is a view in front elevation;

Figs. 4, 5 and 6 are views of the frame respectively in front elevation, side elevation and plan;

Figs. 7, 8, and 9 are corresponding views of the shield;

Figs. 10 and 11 are views of the cradle respectively in side and front elevation.

There is shown a portion of an armored wall 5 which is provided with a circular opening for receiving a hemispherical frame 6 constituting a fixed shield. The frame projects on the outer side of the wall 5 and has a flange 7 bearing against the inner side of the wall 5 and secured thereto by bolts 8. The upper and lower portions of the flanges include a pair of substantially vertical aligned half-bearings 9—9 for which caps 10—10 are provided. The projecting portion of the frame is formed with a relatively large opening 11.

A shield 12 having a substantially hemispherical external surface fitting in the correspondingly shaped frame includes a pair of aligned trunnions 13—13 which are mounted in the half-bearings 9—9 and confined by the caps 10—10. The shield 12 has a centrally disposed and vertically elongated opening 14 substantially the same height as the opening 11 in the frame and coinciding therewith but the width of the opening 14 is only about one-half of the width of the opening 11.

The shield is provided internally with webs, a pair of spaced vertical webs 15—15 being disposed on opposite sides of the openings 14, and each of the vertical webs being joined by a horizontal web 16, the pair of webs 16—16 arranged diametrically of the shield. Each of the united webs 15—16 carries a half-bearing 17 for which a cap 18 is provided. The inside face of the shield between the vertical webs is formed with a cylindrical surface 19.

A cradle which consists of a cylindrical wall 20 and parallel side walls 21—21 is disposed between the spaced webs 15—15 and fits in the cylindrical surface 19 of the shield. The side walls of the cradle include a pair of horizontally aligned trunnions 22—22 which are mounted in the half-bearings 17 and confined by the caps 18. The rear portion of the narrow cylindrical cradle is cut away and the side walls 21—21 are provided with a pair of aligned apertures 23—23 which are positioned in rear of and below the trunnions 22—22 and adapted to receive a pin 24 which serves to attach an instrument such as a machine gun 25 to the cradle.

The gun is disposed between the side walls of the cradle and its barrel or barrel jacket passes through an opening 26 forming a bearing in the cylindrical wall 20 and is supported by the wall. A projecting annular lip 27 formed on the wall and laterally confined in the elongated opening 14 increases the length of the bearing and serves as a stop to engage the shield at the upper and lower ends of the opening 14 to limit movement in elevation of the cradle and gun and to engage the frame at the sides of the opening 11 to limit movement in traverse.

In order to move the gun in elevation it is only necessary to act vertically on its breech end and cause the cradle 20—21 to be rotated on its trunnions 22. In order to move the gun in traverse the operator acts horizontally on the gun and the cradle transmits this pressure to cause the shield 12 to swing on its trunnions 13. These movements may be combined and the gun can be freely pointed in any direction within the limits imposed by the structure of the universal mounting.

I claim:

1. In a universal mounting, a supporting wall having an opening, a hemispherical frame attached to the wall and projecting through the opening therein, said frame having an opening in its projecting portion and having substantially vertical aligned bearings disposed within the supporting wall, a shield having a hemispherical external surface fitting in the frame and having a vertically extending cylindrical internal surface, said shield having a vertically elongated opening in the cylindrically surfaced portion, trunnions on the shield mounted in the bearings of the frame, webs in the interior of the shield and provided with spaced horizontally aligned bearings, a cradle having parallel sides and a cylindrical wall fitting in the cylindrically surfaced portion of the shield, trunnions on the side walls of the cradle and mounted in the bearings of the shield, means on the cradle for attachment of a member, and the cylindrical wall of the cradle having an opening adapted to receive and support the member and having a projecting annular lip disposed in the elongated opening of the shield.

2. In a universal mounting, a hemispherical frame having an opening, a hemispherical shield fitting in the frame, trunnions on the shield and mounted in the frame, said shield having a centrally disposed elongated opening extending towards the trunnions, a cradle within the shield and having parallel side walls and a cylindrical wall, trunnions on the cradle mounted in the shield on an axis perpendicular to and intersecting the axis of the shield trunnions and positioning the cradle for movement across the elongated opening in the shield, means on the cradle for the attachment of a member, and the cylindrical wall of the cradle having an opening adapted to receive the member, and having a projecting annular lip disposed in the elongated opening of the shield.

3. In a universal mounting, a hemispherical frame having an opening, a hemispherical shield fitting in the frame, trunnions on the shield and mounted in the frame, said shield having a centrally disposed elongated opening extending towards the trunnions, a cradle within the shield and having parallel side walls and a cylindrical wall, trunnions on the cradle mounted in the shield on an axis perpendicular to and intersecting the axis of the shield trunnions and positioning the cradle for movement across the elongated opening in the shield, the radii of adjacent complementary surfaces of the cradle and shield being substantially the same means on the cradle for the attachment of a member, and the cylindrical wall of the cradle having an opening adapted to receive the member.

ROBERT J. LENNON.